United States Patent
Behnke et al.

(10) Patent No.: US 6,682,416 B2
(45) Date of Patent: Jan. 27, 2004

(54) AUTOMATIC ADJUSTMENT OF A TRANSFER DEVICE ON AN AGRICULTURAL HARVESTING MACHINE

(75) Inventors: Willi Behnke, Steinhagen (DE); Norbert Diekhans, Gütersloh (DE); Jochen Huster, Gütersloh (DE); Gunnar Quincke, Soest (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 50 days.

(21) Appl. No.: 10/036,781

(22) Filed: Dec. 21, 2001

(65) Prior Publication Data
US 2002/0083695 A1 Jul. 4, 2002

(30) Foreign Application Priority Data
Dec. 23, 2000 (DE) .......................... 100 64 861
Dec. 23, 2000 (DE) .......................... 100 64 862

(51) Int. Cl.[7] .......................... A01D 17/02; A01F 12/46
(52) U.S. Cl. .................. 460/114; 460/119; 141/231; 701/50
(58) Field of Search .................. 141/231, 67, 94, 141/95, 192, 198; 414/334, 398, 335, 389, 340, 345; 56/16.6; 460/114, 119; 701/50, 212, 207; 702/5; 340/988

(56) References Cited

U.S. PATENT DOCUMENTS

| | | | | |
|---|---|---|---|---|
| 4,042,132 A | * | 8/1977 | Bohman et al. | 414/335 |
| 4,376,609 A | * | 3/1983 | Bohman et al. | 414/335 |
| 5,575,316 A | * | 11/1996 | Pollklas | 141/198 |
| 5,749,783 A | * | 5/1998 | Pollklas | 460/119 |
| 5,842,920 A | * | 12/1998 | Siepker | 460/119 |
| 5,901,535 A | * | 5/1999 | Duckinghaus et al. | 56/10.2 G |
| 6,097,425 A | * | 8/2000 | Behnke et al. | 348/89 |
| 6,216,071 B1 | * | 4/2001 | Motz | 701/50 |
| 6,247,510 B1 | * | 6/2001 | Diekhans et al. | 141/231 |

FOREIGN PATENT DOCUMENTS

| | | |
|---|---|---|
| DD | 155 157 | 5/1982 |
| DE | 43 22 293 | 1/1995 |
| DE | 44 26 059 | 2/1996 |
| DE | 44 31 824 | 5/1996 |
| DE | 696 09 362 | 7/1996 |
| DE | 195 31 662 | 3/1997 |
| DE | 196 29 618 | 1/1998 |
| DE | 196 47 523 | 5/1998 |
| DE | 197 03 074 | 7/1998 |
| DE | 198 30 858 | 1/2000 |
| DE | 198 48 127 | 4/2000 |

* cited by examiner

Primary Examiner—Árpád Fábián Kovács
(74) Attorney, Agent, or Firm—Husch & Eppenberger, LLC; Robert E. Muir; Robert C. Haldiman (57) ABSTRACT

An apparatus for automatic adjustment of a transfer device on an agricultural harvesting machine includes a sensor for determining the current position of the transfer device; means for adjustment of the transfer device; a navigation device located in the harvesting machine for determination of a first and a second navigated position in a field; and an electronic analyzer wherein the electronic analyzer automatically adjusts the transfer device through the means for adjustment as a function of the current position of the transfer device and the first and second navigated positions of the harvesting machine.

24 Claims, 5 Drawing Sheets

AUTOMATIC ADJUSTMENT OF A TRANSFER DEVICE ON AN AGRICULTURAL HARVESTING MACHINE

TECHNICAL FIELD OF THE INVENTION

The present invention relates generally to agricultural machinery and, more particularly, to an apparatus and a method for automatically adjusting a transfer device on an agricultural harvesting machine for controlling the transfer of harvested crop from the harvesting machine to a transport vehicle.

DESCRIPTION OF THE RELATED ART

Harvesting machines, such as combine harvesters, pick up crop continuously during the harvesting process, treat the crop in a known manner and discharge the crop either continuously (e.g. as with a forage harvester) or after intermediate storage (e.g. as with a combine harvester) to a loading receptacle. Harvesting machines generally have a transfer device for transferring the crop. In a combine harvester, the transfer device is comprises a grain tank unloading tube. In a forage harvester, the transfer device is comprises an upper discharge chute. The loading receptacle may be located directly on the transport vehicle or on a trailer hitched to the transport vehicle.

In a forage harvester, which requires constant discharge of the harvested crop, the transport vehicle travels next to or behind the harvesting machine. It is extremely difficult to transfer the harvested crop from the forage harvester to the transport vehicle while both vehicles are moving. It is similarly difficult to transfer harvested crops from a combine harvester to a transport vehicle while both vehicles are moving, which is a common practice used to maximize the amount of time the combine is actually harvesting crops.

The harvesting machine and the transport vehicle are each controlled by an operator. The operator of the harvesting machine must monitor the harvesting process continuously as well as control the transfer device. If crop is transferred to a transport vehicle following behind a harvesting machine, the operator has the additional problem of the transfer region being located in the opposite direction of the crop pick-up region. As a result, the operator must look away from the crop pick-up region and towards the transfer region when monitoring and controlling the transfer device.

The operator of the harvesting machine communicates instructions to the operator of the transport vehicle by means of ordinary hand signals or via a radio telephone link, for optimum filling of the transport receptacle. This coordinated movement is particularly necessary when the transfer device can not be adjusted, such as when it has reached the end of its pivot range about the vertical axis of rotation. However, this communication system may break down if mechanical problems occur within an operator's vehicle. In addition, this communication system may not be sufficiently effective at the beginning of the transfer process, when operators are under stress because the trajectory of the crop through the air cannot yet be estimated clearly by the vehicle operators. In these instances, the respective vehicle operators must adjust the vehicle's steering angle, travel speed, and crop pick-up quantity and cannot concentrate on the transfer process at the same time.

These known methods of control of the transfer device and coordination of the transport vehicles require the operators to pay full attention to one another and to continuously communicate with one another via hand signals or voice instructions. When it grows dark or when processing time is lengthy, there are difficulties in coordination which lead to unnecessary downtime of the vehicle, crop losses or even damage to the harvesting machine or the transport vehicle due to corresponding driving errors.

Devices which aim to simplify the transfer of crop and relieve the burden on operators have been developed. German patent DD 155 157 discloses a positioning device between a harvesting vehicle and a transport vehicle. The distance between the transport vehicle and the harvesting vehicle is determined by acoustic or optical sensors on the harvesting vehicle, with the aid of reflected signals, and is converted to corresponding operator information. Also, a radio link is established between the harvesting vehicle and the transport vehicle for transmitting the operator information from the harvesting vehicle to the transport vehicle. The operator of the transport vehicle is notified by a radio transmission link when the distance between the vehicles exceeds the minimum operating distance. In addition, the crop level in the transport receptacle is determined by corresponding sensors in the transport receptacle. An indicator in the driver's cab notifies the operator when a particular section of the receptacle is suitably filled. With the aid of these signals, the operator can control the position of the transport receptacle in such a way that the crops may be loaded at an emptier section of the transport receptacle. If the transport receptacle leaves the region covered by the individual sensors, the transfer device is switched off.

This system is based on sensor signals which determine distance as a function of the travel time of a magnetic wave emitted between the harvesting vehicle and the transport vehicle. Dust adversely affects the reliability of the sensor signals. The sensor devices and reflectors become contaminated during operation because the area around the harvesting machine is extremely dusty. An additional disadvantage of this system is its limited field of application. Using this system, only the vehicle directly involved in the transfer process can be monitored. Furthermore, this system can only be used with harvesting vehicles in which crop can be stored at least temporarily, as the transfer device is automatically switched on and off when the transport vehicle is located inside and outside the detection ranges respectively. This system also requires each transport vehicle to be equipped with a corresponding, special device.

German patent DE 195 31 662 A1 describes another device in which the relative orientation of the transfer device to a transport receptacle is determined by means of optical distance sensors which are mounted directly on the transfer device. With the measurement data obtained by the sensors, the transfer device is then adjusted either manually or automatically for optimum transfer. Various adjusting mechanisms for the transfer device can be utilized. For example, the transfer device may be formed by an upper discharge chute on a self-propelled harvesting machine, which is mounted horizontally on the vehicle and pivots vertically. Furthermore, a pivotable discharge flap which allows for the adjustment of the direction of discharge of the crop stream may be located at the end of the upper discharge chute.

Another device of this kind is disclosed by German patent DE 44 26 059 A1 for a self-propelled harvesting machine. In the system disclosed, a camera is provided with an image range directed onto both the discharge flap and the transport receptacle, wherein the image is displayed to the vehicle operator of the self-propelled harvesting machine on a monitor in the driver's cab for control of the transfer device.

All the above-mentioned devices are flawed in that they fail when there is dust in the detection range of the camera or sensors. The optical sensors or the reflectors thus quickly become dirty, which precludes sufficiently reliable detection of the transport receptacle. Also, the known devices fail when the operators of the vehicles are inexperienced or inattentive and the transport receptacle is driven into a region which lies outside the possible transfer range.

The present invention is directed to overcoming one or more of the problems set forth above.

SUMMARY OF THE INVENTION

An aspect of the present invention is to provide a device for automatic adjustment of a transfer device on an agricultural harvesting machine that can function in dusty conditions.

Another aspect of the present invention is to provide a device for automatic adjustment of the transfer device independently of the driver of the harvesting machine.

In accordance with the above aspects of the invention, there is provided an apparatus with an electronic analyzer connected to a navigation device that automatically adjusts the transfer device on an agricultural machine as a function of a first and at least a second navigated position of the harvesting machine, which has been determined by the navigation device. In another embodiment, the electronic analyzer also utilizes a navigation position of a transport vehicle, which is determined by a second navigation device located on the transport vehicle and transmitted by a data transmission link to the electronic analyzer, to adjust the transfer device. In a preferred embodiment, the navigation devices are global-position systems, which are suited for rough use and are advantageously unaffected by dust and/or dirt.

In a further embodiment of the invention, the electronic analyzer is connected to at least one distance sensor for detecting the distance between the harvesting machine and the transport vehicle. Thus, the additional improvement of collision protection is provided in the event of failure of the navigation devices. When a transport vehicle is not equipped with a data transmission link or a navigation device, automatic control of the transfer device can be effected by means of the distance sensor. Even at the beginning of transfer, when no reliable information can be given about the relative position of the transport receptacle from the global positioning system position(s), automatic transfer control can be carried out exclusively by the distance sensor or in conjunction with the navigated positions.

In yet another embodiment, the electronic analyzer is connected to at least one means for detecting at least one parameter of the harvesting process, for example, the type of crop or the wind effect, which is taken into consideration in control of the transfer device. These parameters can affect or even impair the distance and direction of transfer. Advantageously, these parameters are taken into consideration in the automatic control of the transfer device, resulting in a noticeable improvement in control of the intended point of impingement of the crop within the transport receptacle of the transport vehicle.

In accordance with the aspects of the invention listed above, a method of automatically adjusting a transfer device on a harvesting machine is provided which includes the steps of determining the current position of the transfer device with at least one sensor; determining a first and at least a second navigated position of the harvesting machine with a first navigation device; generating at least one adjusting parameter for the transfer device as a function of the current position of the transfer device and the first and second navigated positions of the harvesting machine with an electronic analyzer having a memory device; and automatically adjusting the transfer device with means for adjustment based on the adjustment parameter generated by the electronic analyzer. Through this method, an automatic adjustment of the transfer device is calculated from just two navigated positions derived from a device that is not affected by dusty or dirty conditions.

In another embodiment of the invention, an additional step includes determining a first navigated position of the harvesting machine and at least one navigated position of the transport vehicle and using these navigated positions to help generate the adjusting parameter. As a result, the transfer device is automatically adjusted when the relative orientation of the harvesting machine and transport vehicle is altered. In another embodiment, a distance sensor is used to determine the distance between the harvesting machine and the transport vehicle.

These aspects are merely illustrative aspects of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made to the drawings, which illustrate the best known mode of carrying out the invention and wherein the same reference characters indicate the same or similar parts throughout the views.

DETAILED DESCRIPTION

Figure 1:
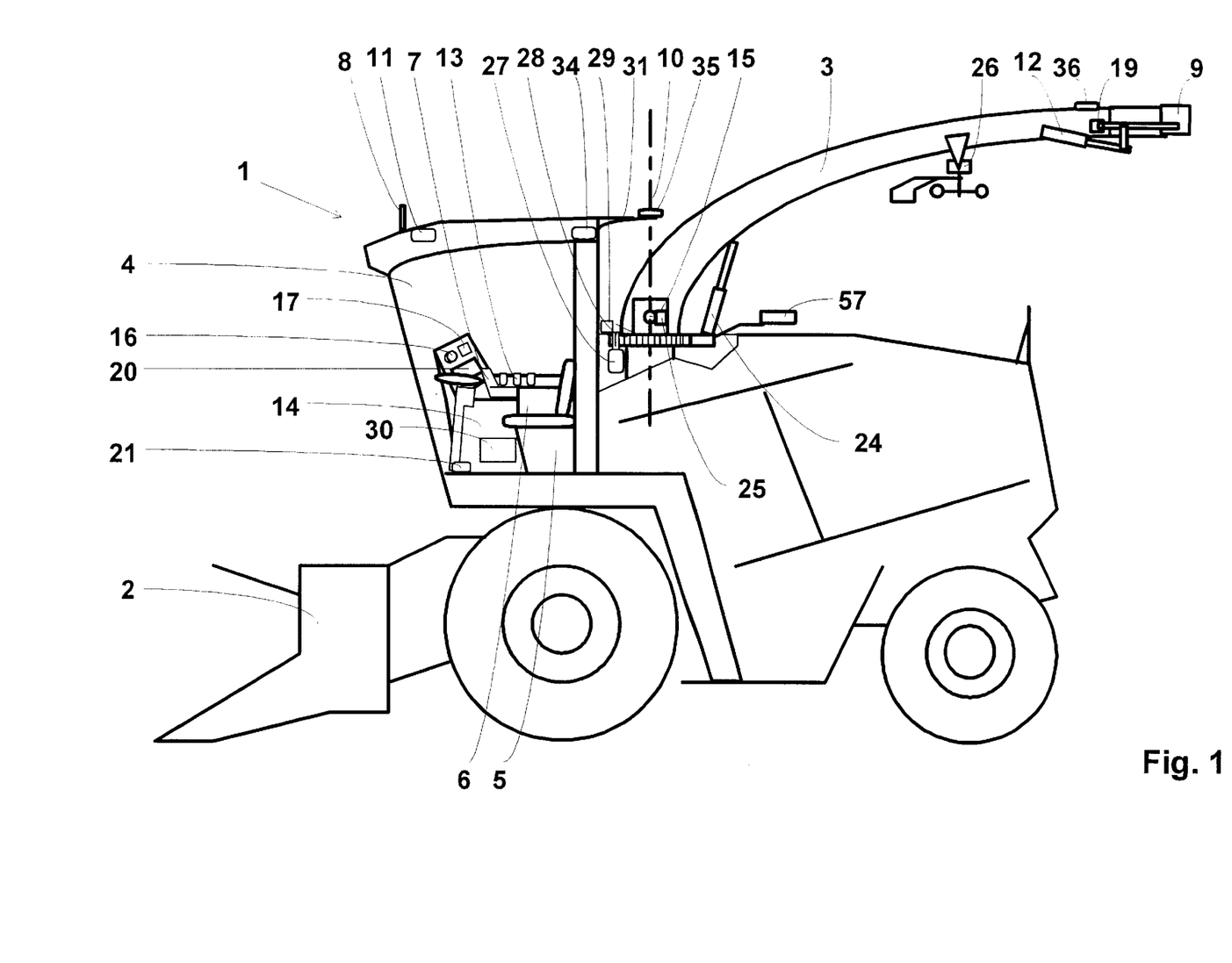
FIG. 1 is a schematic side view of a harvesting machine incorporating one embodiment of the invention.

FIG. 1 shows a harvesting machine 1 having a crop pick-up device 2 and a transfer device 3. The harvesting machine 1 also has a driver's cab 4 that includes a seat 5 with a multi-function handle 7 mounted on the armrest 5. The multifunction handle 7 is equipped with several control buttons and switches. The operator of the harvesting machine 1 can, by means of these control buttons and switches, influence the function and adjustment of the harvesting machine 1. For example, the operator can adjust the height of the crop pick-up device 2, pivot the transfer device 3 about its vertical axis of rotation 10, control the direction of the transfer flap 9, and alter the height of the transfer device 3 about its horizontal axis of rotation 15. Control elements for manual presetting and correction of a standard for automatic control of the transfer device 3 are located on a joystick mounted on the seat 5 and on the control console 14 located adjacent to the seat 5. The control console 14 includes other control elements 13, 16, such as switches or rotary adjusting elements, as well as indicating elements 17 and, depending on the equipment of the vehicle 1, a monitor 20 or LCD display. A foot switch 21 is located on the driver's cab floor for activation or deactivation of at least one device of the apparatus according to the invention. At least one electronic analyzer 30 is located in the control console 14.

By means of the individual control elements 13, 16, 7, the operator of the harvesting machine 1 can make the adjustments of the harvesting machine 1 directly by means of electrohydraulic servo drives 12, 24, 27 and other drives. By actuating switch 13 on the control console 14, for example, the transfer height of the transfer device 3 can be adjusted. The switch signal of the switch 13 drives a hydraulic valve, not shown, which then dispenses a quantity of oil to the hydraulic cylinder 24 and so raises the crop-discharging side of the transfer device 3. A sensor 25 that determines the relative position of the transfer device 3 on the horizontal axis of rotation 15 of the harvesting machine 1, i.e., the transfer height, is located on the horizontal axis of rotation 15 of the transfer device 3. The adjustment of the transfer flap 9 is predetermined by the position of the hydraulic cylinder 12 and detected with a further sensor 19. The sensor 19 thus determines the relative direction of discharge relative to the orientation of the transfer device 3. The operator of the harvesting machine 1 can manually alter the direction of the transfer flap 9 and thereby control the transfer distance.

The respective position of the transfer device 3 and transfer flap 9, which is detected by sensors 19, 25, is transmitted to the electronic analyzer 30. The electronic analyzer 30 can then, in conjunction with the known height of the horizontal axis of rotation 15 above the field and the dimensions of the transfer device 3, determine a theoretical transfer distance. The analyzer 30 can also then indicate the transfer distance to the operator via the monitor 20 or a corresponding LCD display, or can make further use of the transfer distance in additional calculations. The direction of transfer of the transfer device 3 can be altered by the operator of the harvesting machine 1 by remote control. The direction of transfer is then pivoted about the vertical axis of rotation 10 by means of a corresponding control of the hydraulic drive 27, whose output engages in a gear rim 28. A sensor 29 detects the respective adjusted direction of transfer of the transfer device 3 relative to the self-propelled harvesting machine 1.

The current position of the harvesting machine 1 in the field is advantageously determined by means of a navigation device with at least one associated global positioning system aerial 35. Any navigation system known to those skilled in the art that can determine a relative position of the harvesting machine 1 in relation to a fixed point or a reference system is suitable.

The harvesting machine 1 is also equipped with a data transmission device in the form of a transmitting or receiving device 11. A data transmission link to a further vehicle in the field can thereby enable the exchange of data between the transport vehicle and the harvesting machine 1. This link is advantageously designed as a bidirectional radio link with only a short range. The harvesting machine 1 is equipped with an ordinary radio device 8, 11 that receives a navigated position of a transport vehicle within a radius of 50 meters around the radio aerial 8. If a transport vehicle now moves within this radio range, the harvesting machine 1 automatically receives a navigated position of the transport vehicle.

A global positioning system aerial 35 is located on the driver's cab 4, to the rear on a bracket 31. Advantageously, the aerial 35 is mounted directly on the vertical axis of rotation 10 of the transfer device 3. The mounting position of the global positioning system aerial 35 indicates the respective position determined by the navigation system in the reference system as a representation of the harvesting machine 1. Another global positioning system aerial 36 can be mounted on the crop-discharging side of the transfer device 3. These global positioning system aerials 35, 36 also contain devices for receiving a correction signal for the respective navigated position.

The self-propelled harvesting machine 1 is also equipped with at least one additional device 34 for determining the orientation of the harvesting machine 1 in a reference system, such as an electronic compass for example. Other devices, such as tilt or acceleration sensors can also be incorporated into the harvesting machine 1. A wind measuring device 26 may also be advantageously mounted on the transfer device 3.

The individual sensors and devices 7, 8, 11, 13, 15, 17, 20, 21, 26, 30, 35, 36, 57 in the harvesting machine 1 can be connected to the machine control and to each other by a vehicle bus system. Additional devices and sensors designed to monitor various working parameters of the harvesting machine 1, such as the speed of travel, the load, the quantity of yield, the dimensions of the harvesting machine, dimensions of the vehicle, dimensions of the transport receptacle, dimensions of the transfer device, safety quantities, or the relative minimum distance between the harvesting machine and transport vehicle, can be incorporated into the machine 1 and connected to the electronic analyzer 30 via the vehicle bus system. Multiple entry or detection of quantities or data at the harvesting machine 1 is thereby avoided. These quantities can be extracted from a transport vehicle via existing means or by means of a data transmission link and can be taken into consideration for adjustment of the transfer device 3. By means of this data, further calculations can then be made by the electronic analyzer 30 without having to make a great outlay. Moreover, data can be transmitted from the electronic analyzer 30 to another device in the harvesting vehicle 1 in order to be displayed or taken into consideration for further analysis.

In an alternate embodiment, a computer system 63, not shown, is also installed in the harvesting machine 1. The computer 63 analyzes the individual parameters of the harvesting machine 1 and then displays them graphically on the monitor 17 or LCD display. A map of the field to be harvested can be stored or recorded during processing by the computer system 63. The navigated position of the harvesting machine 1 within the field is then constantly determined by the computer system 63 by means of the navigation device. When the self-propelled harvesting machine 1 approaches a new field, a partial or complete field map filed in the computer system's memory can be automatically selected and displayed on the monitor 20. When the harvesting machine 1 approaches the boundary of the field and the vehicle operator switches on at least one implement, such as the chopper drum or the crop pick-up device 2, the transfer device 3 can be automatically pivoted out of the transport position and into a working position. The transfer device 3 is then automatically oriented with the aid of the existing possible driving ranges for a transport vehicle.

The monitor 20 may also advantageously be used for display of an existing field map. The monitor displays a schematic representation of the harvesting machine 1 and any other vehicles in use in the field and indicates vehicle adjustments and harvesting parameters. In one embodiment, the monitor 20 is a touch screen monitor, thereby allowing adjustments and settings to be made by means of the monitor 20. Other activated devices and selected methods, including activated apparatus and automatically generated settings, are also displayed.

At least one distance sensor 57 is also mounted on the harvesting machine 1. In the embodiment shown in FIG. 1, the sensor 57 is linked to the transfer device 3. When the transfer device 3 is pivoted about the vertical axis of rotation 10, the distance sensor 57 is also pivoted and is, therefore, always oriented in the direction of transfer. The distance determined by the distance sensor 57 is taken into consideration when generating an adjustment for the transfer device 3. In particular, this distance can be used at the beginning of a transfer, after the vehicles enter a field, or on a new processing track for automatic control of the transfer device 3. The distance sensor 57 scans in an approximately horizontal plane, affording the added advantage of being able to determine the relative orientation of the laterally scanned transport receptacle wall and hence the direction of travel of this wall relative to the longitudinal axis of the harvesting machine 1. Further, the distance value of the distance sensor 57 can also be used advantageously for substitute control of the transfer device 3, in case of a failure or elimination of the navigation device or of the data transmission link on the harvesting machine 1 or on the transport vehicle.

Other devices and controls, such as the harvesting machine drive system and a means for monitoring machine operating parameters such as steering angle and travel speed, are well known to those skilled in the art. Thus, further description of these items is not deemed necessary. However, these types of devices can be integrated into one or more embodiments of a preferred embodiment of the invention.

Figure 2:
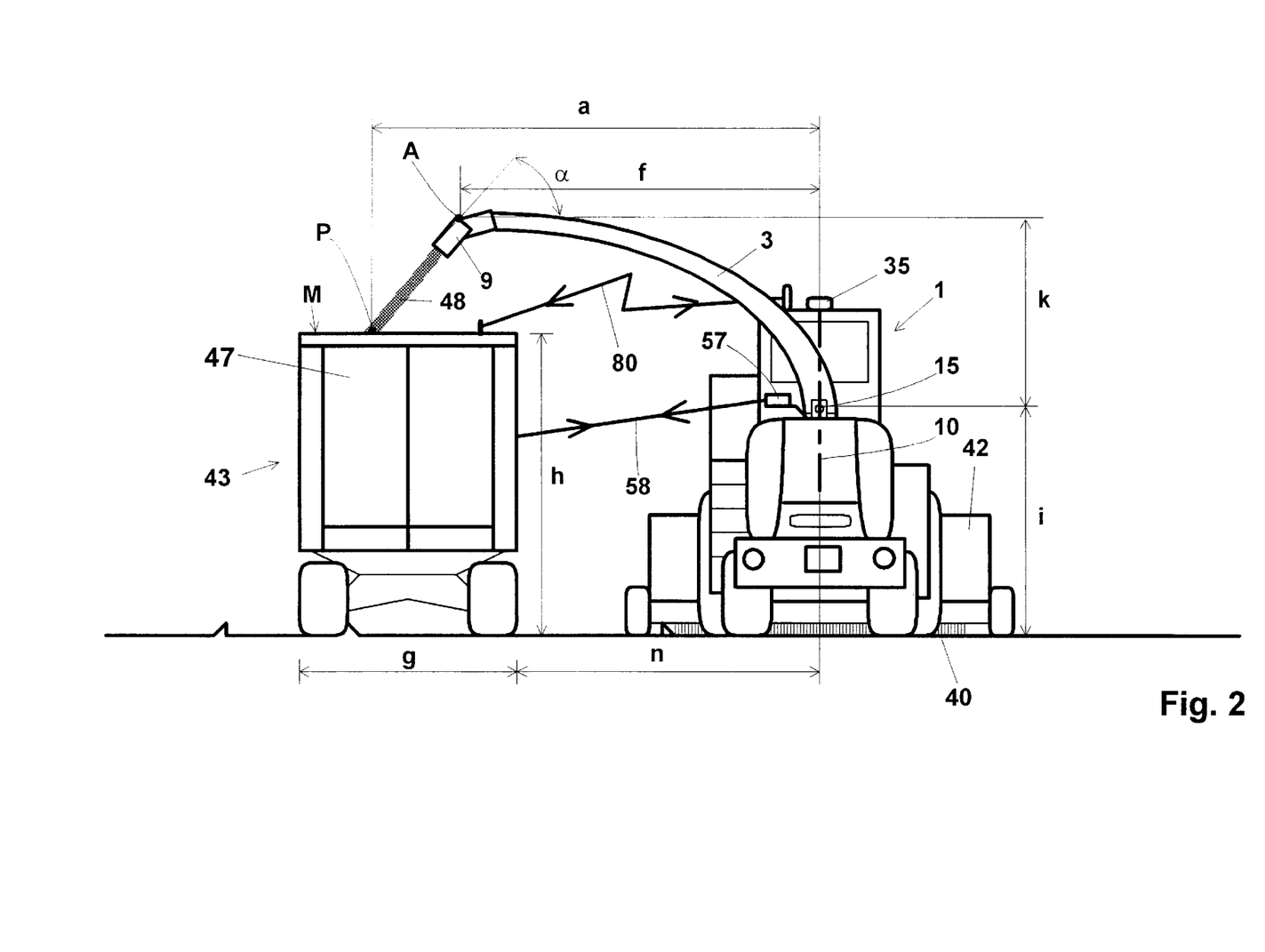
FIG. 2 is a schematic rear view of a harvesting machine and a transport vehicle incorporating an embodiment of the invention.

FIG. 2 illustrates a harvesting machine 1 and a transport vehicle 43 during lateral transfer of crop 48 from the harvesting machine 1 to the transport vehicle 43. A distance sensor 57 utilizes a scanning beam 58 to determine the distance n between the vertical axis of rotation 10 and a side gate of a transport receptacle 47 located on the transport vehicle 43. Distance sensors of this type are well known in the art. Reliable crop 48 transfer requires that the transfer point P be positioned with at least a distance a located within the width g of the transport receptacle 47. The transfer device 3 can then be automatically controlled to ensure that the distance from the transfer point P to the gates of the transport receptacle 47 is constant relative to at least one wall. Therefore, preferably with the adjustment of the transfer flap 9, a varying distance n is regulated. The distance a–n indicates the distance from the transfer point P to the gate and can be predetermined as a nominal value, for example on activation of the automatic control. According to this embodiment of the invention, a variation in the distance n, which is sensed with the scanning beam 58, causes an automatic adjustment of the discharge angle α such that the nominal distance a–n is maintained.

To calculate the correcting variable that must be produced to alter the transfer point P by a variation of the discharge angle α, it is necessary to determine the distance f from point A to the vertical axis of rotation 10 as well as the height k+i and the height h of the gate above the field 40. The distance f and the height k are determined from the known dimensions of the transfer device 3 and its relative adjustment on the horizontal axis of rotation 15 in relation to the harvesting machine 1. The height i and the height h are fixed vehicle parameters and can be stored in a memory device. The height h can also be transmitted by means of a control element 13, 16 or by the data transmission link 80 as a function of the transport vehicle 43.

In order to automatically control the transfer device 3 as a function of navigated positions according to one embodiment of the invention and thereby maintain the transfer point P relative to the walls of the transport receptacle 47, any changes in the positions of the harvesting machine 1 and the transport vehicle 43 relative to one another must trigger a compensating correcting signal.

During crop transfer, the location of transfer point P within a plane M, which is preset by the upper edges of the transport receptacle walls, can also be monitored. The relative position of the plane M is predetermined by the relative position of the transport vehicle 43 in the field 40, and, consequently, can be determined from the current position of the transport vehicle 43 and from known dimensions, such as width g, height h and length of the transport receptacle 47. The plane M can also be derived from the distance n and the dimensions of the transport receptacle. The transfer point P can be calculated from the determination of the position of point A and the discharge angle α as described above. In this case, the distance of the global positioning system aerial 35 on the vertical axis of rotation 10 above the horizontal axis of rotation 15 must be taken into consideration. The use of navigated positions helps determine the positions of the harvesting machine 1 and the transport vehicle 43 relative to one another and any changes thereto. These positions, when compared to a nominal setting for the relative position of point P to at least one front or tail gate, can be utilized to automatically adjust the transfer device 3 about the vertical axis of rotation 10.

Figure 3:
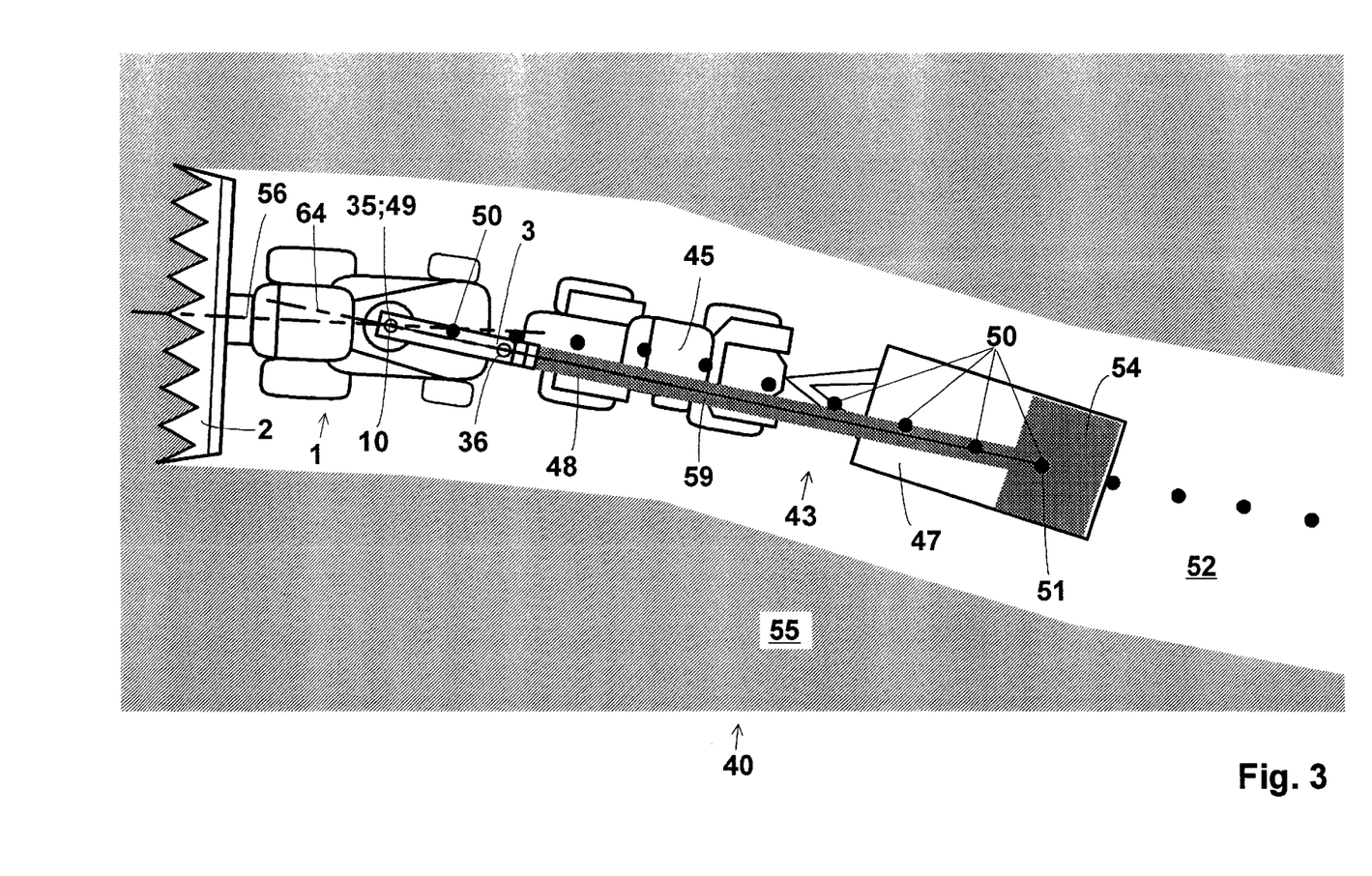
FIG. 3 is a schematic plan view of a harvesting machine and transport vehicle composed of a traction unit and a trailer incorporating an embodiment of the invention.

FIG. 3 is a plan view of a self-propelled harvesting machine 1 during transfer of crop 48 to a transport vehicle 43 following behind the harvesting machine 1. The harvesting machine 1 picks up crop 41 from the field 40, processes it and transfers it by means of the transfer device 3 to a transport receptacle 47, while traveling along a processing track 52. The transport receptacle 47 is shown partially filled with crop 54. Unprocessed field 55 surrounds the harvesting machine 1.

During harvesting, the current position 49 of the harvesting machine 1 is determined by the global positioning system aerial 35 positioned on the vertical axis of rotation 10 of the transfer device 3 and stored in a memory device, not shown. In order to determine the necessary direction of transfer 64, which is required for automatic control of the transfer device 3, the electronic analyzer 30 selects from the memory device, a stored position 50 in the vicinity of the desired point of impingement 51. This purpose can be served by setting a given transfer distance, an instantaneous transfer distance, which can be derived by adjustment of the transfer device 3, or a distance between the harvesting machine 1 and the transport vehicle 43. Between the current navigated position 49 of the harvesting machine 1 and the further position 50, 51 called up from the memory device, a connecting section 59 can now be produced. The relative direction of this connecting section 59 relative to the longitudinal axis 56 of the harvesting machine 1, indicates the direction of transfer necessary for optimum transfer. The orientation of the longitudinal axis 56 of the harvesting machine 1 in the reference system can be determined with the aid of a compass 34 or the direction of the link between the current position 49 and the last stored position 50. The desired direction of transfer is converted to a relative angle between the longitudinal axis 56 of the harvesting machine 1 and the transfer device 3. Then the transfer device 3 is pivoted accordingly by the automatic control until the desired angle is achieved.

In another embodiment, a second global positioning system aerial 36 is located on the crop-discharging side of the transfer device 3. In this case, determination of the position of the longitudinal axis 56 of the harvesting machine 1 in the reference system is unnecessary, and the actual direction of transfer 64 can be determined from the current navigated position 49 and from the current navigated position of the second global positioning system aerial 36.

In another embodiment, a global positioning system aerial is located on the transport vehicle 43. The navigated positions of the transport vehicle 43 can be transmitted constantly by means of a data transmission link and the associated aerials to the harvesting machine 1. These positions are then stored in a memory device, not shown. The driving track of the transport vehicle is determined from the individual stored positions. For calculation of the adjustment of the transfer device 3, a connecting section 59 is determined from the position of the vertical axis of rotation 10 of the transfer device 3, which corresponds to the current navigated position 49 of the harvesting machine 1, and from a further position which corresponds to a navigated position of the transport vehicle 43 called up from the memory device.

Monitoring of the crop transfer can be effected as shown here with the aid of the driving track of the traction vehicle 45 and the current navigated position of the transport vehicle 43. Based on this information, the instantaneous position of a transport receptacle 47 in the field 40 can be determined, since the hitched transport receptacle 47 in traction mode as a rule approximately follows the driving track of the traction vehicle with only minor variations in direction of travel. A desired point of impingement 51 and the permitted range of transfer of crop 48 to the transport receptacle 47 are provided by the current navigated position of the transport vehicle 43 and the known dimensions of the transport vehicle 43 and transport receptacle 47 in conjunction with the recorded driving track of the transport vehicle 43.

Figure 4:
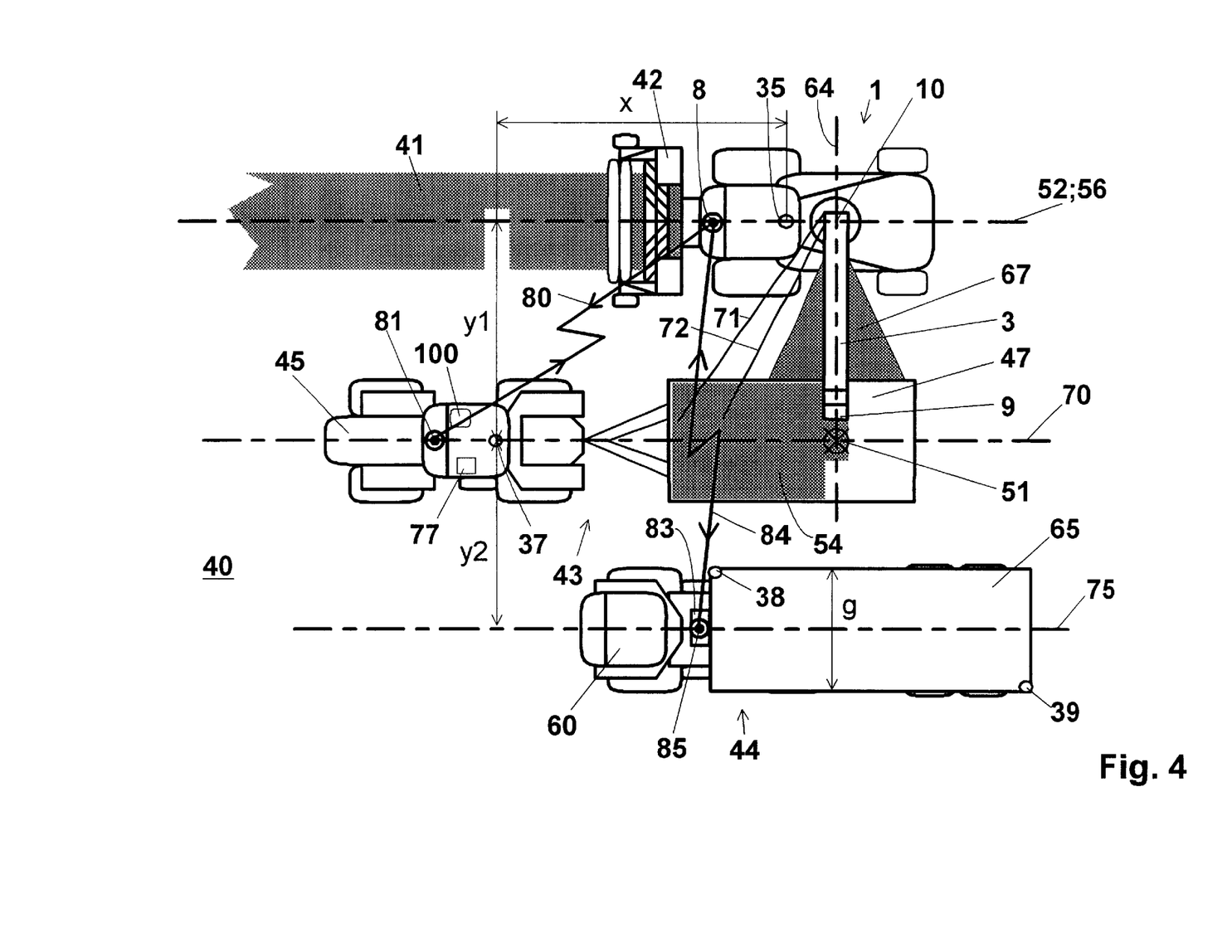
FIG. 4 is a schematic plan view of a harvesting machine and two transport vehicles incorporating an embodiment of the invention.

FIG. 4 shows a harvesting machine 1 and two transport vehicles 43, 44 in a field 40. The harvesting machine 1 picks up crop 41 by means of a pick-up device 42 and transfers it after processing to the first transport vehicle 43, which travels on a driving track 70. The first transport vehicle 43 consists of a traction vehicle 45 and a hitched transport receptacle 47, which is already partly filled with crop 54. The second transport vehicle 44 is shown as a trailer vehicle with a traction vehicle 60 and an empty transport receptacle trailer 65. The second transport vehicle 44 moves along a further driving track 75. The longitudinal directions of the harvesting machine 1 and transport vehicles 43, 44 and that of the transport receptacles 47, 65 are located on respective processing or driving tracks 52, 70, 75 that are parallel to each other. When the driving tracks 52, 70, 75 are not oriented parallel to one another, the respective deviating longitudinal axis 56 or driving track 52, 70, 75 must be taken into consideration in the analyses and calculation for automatic control of the transfer device 3. To simplify the illustration of this embodiment, the simpler configuration of the vehicles 1, 43, 44, in which the driving tracks are parallel to one another, has been shown here.

The harvesting machine 1 is equipped with an aerial 8 and a global positioning system aerial 35. The transport vehicle 43 transmits its current navigated position to the harvesting machine 1 via the data transmission link 80. A vectorial datum in direction and distance or a distance datum in the form of a distance value y1 and a distance value x between the two positions relative to the longitudinal axis 56 of the harvesting machine 1 can be determined from the respective positions of the aerials 35, 37, relative to each other. The distance y1 can also be detected directly by a scanning device mounted on the harvesting machine 1. A scanning device which determines the distance from a wall of the transport receptacle 47 on a schematically shown scanning plane 67 is shown in FIG. 4.

Values x and y1 are used as nominal values during automatic control of the transfer device 3. A variation in the positions of the aerials 35, 37 relative to one another is then generated in an automatic variation of the adjustment of the transfer device 3, by corresponding correcting signals, in such a way that the point of impingement 51 of crop 48 on the transport receptacle 47 remains almost unchanged here. A variation in the relative position is broken down into a variation in the x and y directions and converted according to stored characteristic curves into a corresponding variation of the adjustment of the transfer distance or a corresponding pivoting of the transfer device 3 about the vertical axis of rotation 10.

Furthermore, a desired point of impingement 51 of crop on the transport receptacle 47 can be determined in conjunction with the two positions 35, 37 and at least two further vehicle-related distance values and can be analyzed. A first distance value indicates the distance between the aerial 37 and the point of impingement 51 on the transport receptacle 47, and the second distance value indicates the distance between the global positioning system aerial 35 and the vertical axis of rotation 10 of the transfer device 3. If the global positioning system aerial 35 is arranged on the vertical axis of rotation 10, this distance is zero. But if the respective navigated current positions are shifted by the respective harvesting machine-related or vehicle-related distance values counter to the direction of travel and in the direction of the longitudinal axis 56 or of the driving track 70, then the direction of the section between the two shifted positions yields the angle to be set between the longitudinal axis 56 of the harvesting machine 1 and the longitudinal axis 64 of the transfer device 3. The required transfer distance between the point of impingement 51 and the vertical axis of rotation 10 can further be determined from the length of the section between the two shifted positions, and a corresponding adjustment of the transfer device 3 can be brought about.

The possible transfer range of the transfer device 3 is preset within a pivot range about the vertical axis of rotation 10. There is a fixed adjustment limit 71 in at least one direction. Another freely selected adjustment of the transfer device 3 is provided by a line 72. If the transfer device 3 exceeds the line 72 or if it reaches the adjustment limit 71, a driving instruction is generated and communicated to the operator of the harvesting machine 1 and of the transport vehicle 43. This information is also indicated visibly from the outside on the harvesting machine 1 and leads to automatic action on the direction of travel or speed of travel, by corresponding known control and regulating devices 77 in the harvesting machine 1 or on the transport vehicle 43. Therefore, the intended manual alteration of the transfer device 3 and, consequently, the point of impingement is produced by movement of the harvesting machine or transport vehicle. The operator terminal 100 arranged on the traction vehicle 45 can also serve to indicate the information from the harvesting machine 1 and allow the input of information to the harvesting machine 1. The range of adjustment of the transfer device 3 can also be indicated to the control system by one or two freely preset adjustment limits which, according to the limits 71, 72 reflected on the center axis of the adjustment range, are arranged at the other adjustment limit. Corresponding information is also generated when the other adjustment limits are exceeded.

Another data transmission link 84 exists between the second transport vehicle 44 and the harvesting vehicle 1. Data for automatic adjustment of the transfer device and coordination of movement can thereby be exchanged. Global positioning system aerials 38, 39 are mounted on the transport receptacle trailer 65 at diagonally opposite corner points of the transport receptacle walls. These aerials 38, 39 are connected to a mobile unit 83 mounted on the front receptacle wall that contains a transmitting and receiving device 115 as well as an aerial 85 for data exchange with at least the harvesting machine 1. The absolute dimensions of the transport receptacle trailer 65 and the position of the trailer in relation to the navigated position of the harvesting machine 1 at any particular time are indicated due to the special arrangement of the aerials 38, 39. In addition, these aerials 38, 39 indicate the plane M shown in FIG. 2 and described above, as well as the width g of the receptacle 65. A data memory with specific information on the transport vehicle 44 and possibly further connecting devices to additional devices in the transport vehicle 44 can form a further part of this device 83.

Figure 5:
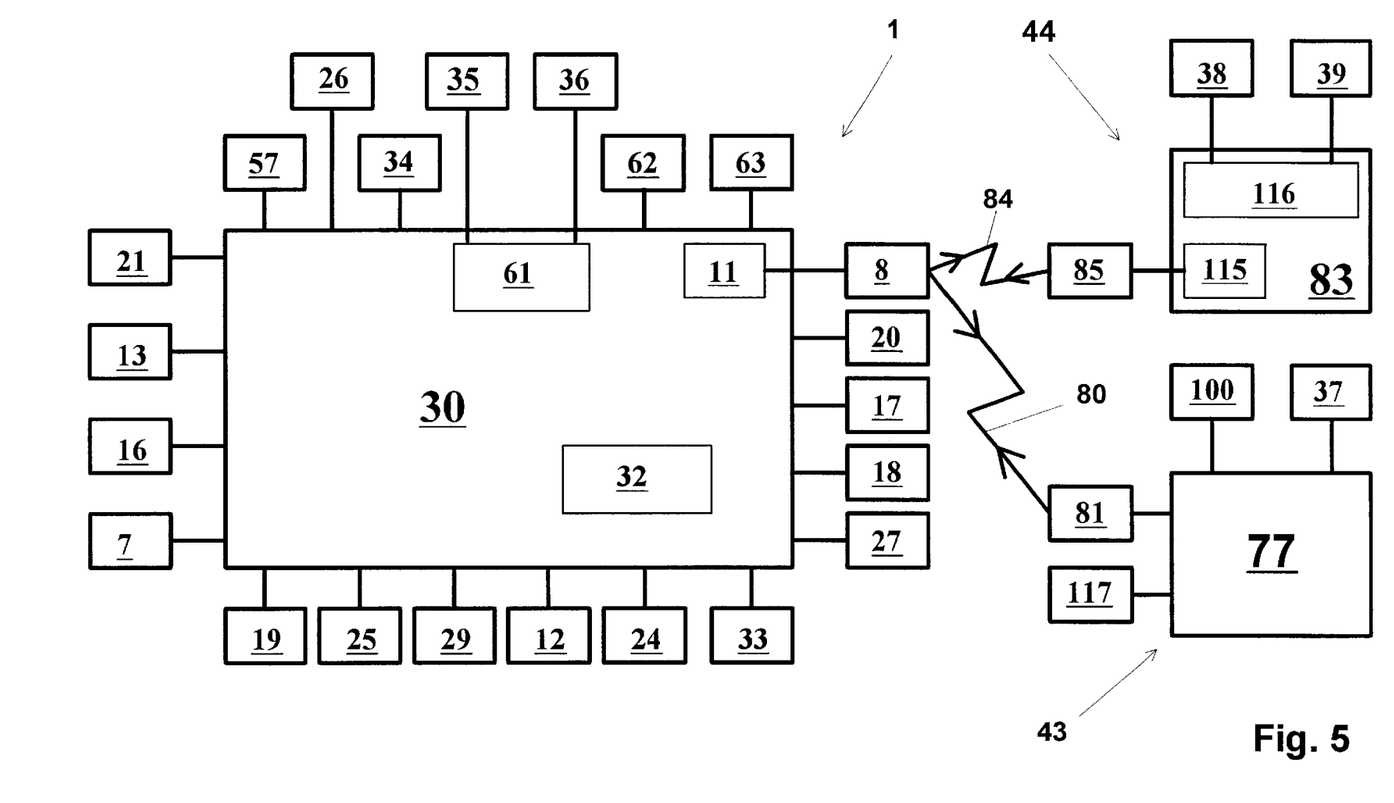
FIG. 5 is a block diagram of an embodiment of the invention.

FIG. 5 shows a schematic representation of an apparatus for automatic control of a transfer device 3. An electronic analyzer 30 is located in a harvesting machine 1. The electronic analyzer 30 contains a navigation device 61 and a memory device 32. The electronic analyzer 30 is connected through a bus link 62 to other electrical devices and sensors in the harvesting machine 1, including devices for determining the speed of travel and devices for determining parameters of the crop, such as the crop throughput. The electronic analyzer is also connected to a computer system 63. The electronic analyzer 30 receives commands for the activation of devices or for manual control of the transfer device 3 from the signals and positions of control elements, including a foot switch 21, switches 13 on a control console 14, and various control elements on a multi-function handle 7. Activation and operation of the apparatus are also performed by means of a touch screen monitor 20. The adjustments and settings are indicated on an existing monitor 20 or display elements 17. A buzzer 18 or other acoustic warning signal notifies the operator if the apparatus is activated or deactivated.

A rotary element 16 in the driver's cab 4 serves for variable presetting of values, such as a nominal setting of a distance x, y or the transfer distance. Correction of sensor values are effected by elements 7, 13, 16. The position of the transfer device 3 is determined by the electronic analyzer 30 in conjunction with signals from sensors 19 and 25. Adjustment of the transfer device 3 is controlled by lifting cylinders 12 and 24. Sensors 33 designed to measure crop parameters, such as crop moisture and wind speed, are also connected to the electronic analyzer 30 to aid in calculating the actual transfer distance.

The position of the transfer device 3 relative to the longitudinal axis 56 of the harvesting machine is detected by a sensor 29 and transmitted to the electronic analyzer 30. This sensor 29 also serves as an actual position indicator. Control of the direction of transfer 64 is accomplished by means of a hydraulic drive 27. The relative position of the transfer device 3 is indicated to the vehicle operator on a monitor 20, on a LCD display 17 or on a needle instrument. A compass 34 is connected to the electronic analyzer 30 in order to determine the longitudinal axis 56 of the harvesting machine 1 in a reference system. As a result, the longitudinal axis 56 and the transfer device 3 can also be shown in conjunction with the current navigated position of the harvesting machine 1. With the aid of the respective current navigated position of the harvesting machine 1 in connection with a field map, the harvesting machine 1 is shown schematically relative to the field 40 on a monitor 20 or on an operator terminal 100.

The current position of the harvesting machine 1 in the field 40 is determined by at least one navigation device 61, which is connected to the electronic analyzer 30. At least one global positioning system aerial 35 is connected to the navigation device 61. In another embodiment, a second global positioning system aerial 36 is also connected to the navigation device 61. A transmitting and receiving device 11 serves as an interface and for control of data transmission links 80, 84. Data can be transmitted to or received from a device 77 in a first transport vehicle 43 via an aerial 81 and a mobile unit 83 on a second transport vehicle 44 via an aerial 85. The mobile unit 83 contains a transmitting and receiving device 115 for control of data exchange and is further equipped with a navigation device 116, which includes a global positioning system aerial 87.

The global positioning system aerial 37 existing on the first transport vehicle 43 is connected via a bus link to the device 77. For the internal exchange and display of data, the device 77 is further connected to an internal bus system 117 and an operator terminal 100.

The apparatus according to the invention and the method are not just confined to the agricultural machines and vehicles 1, 43, 44 shown in detail, but can also be used for any method of crop transfer to a transport receptacle 47, 65. The apparatus and the method can also be used for control of the transfer device when a transport receptacle 47 is hitched directly to a self-propelled harvesting machine 1 or, in one particular embodiment, also semi-mounted directly on the harvesting machine 1.

In a further embodiment, the respective transport vehicle and the transfer device 3 are moved manually into the desired relative position or adjustment, and upon a command this configuration is adopted by the electronic analyzer 30 as the nominal configuration for subsequent automatic control of the transfer device 3. The operators of the harvesting machine 1 and transport vehicle can make their adjustments as usual and then, when a satisfactory configuration in relation to each other is achieved, use this as the nominal setting for automatic transfer control. Further, free adaptation of automatic transfer control to different dimensions of the harvesting machine land transport vehicles is obtained.

In another embodiment, the respective current positions of the harvesting machine and transport vehicle are stored in at least one memory device. Driving tracks for the harvesting machine 1 and the respective transport vehicle are calculated from the stored positions and taken into consideration when generating an adjustment for the transfer device 3. A driving track can be determined from at least one current and one pre-stored position, wherein the resulting section indicates a direction of travel of the transport vehicle or harvesting machine 1. From this section, the orientation of the harvesting machine 1 or transport vehicle in the corresponding reference system can be determined, in particular the orientation of the longitudinal axis of the harvesting machine 1 or transport vehicle. Corresponding sensors and devices for this can then be omitted. For transfer of crop in the direction of the driving track of the harvesting machine 1 already covered, a position located between two navigated positions can also be selected and used according to the invention as a further navigated position for automatic control.

In yet another embodiment, a theoretical point of impingement of the crop on the transport receptacle is calculated from the dimensions and the current adjustment of the transfer device 3, from at least one position and from the orientation of the harvesting machine 1. Even if there is at least one parameter affecting the transfer process, for example wind or machine tilt, this is taken into consideration as well. The relative position of the point of impingement of crop on the transport vehicle in relation to the current position of the harvesting machine 1 affords the advantage that it can be calculated at least theoretically at what location the crop is being transferred. This calculation indicates initially a point of impingement on the level processing area, without including an external influence. Advantageously, this point of impingement on the floor of the transport receptacle or on a higher surface defined by the transport receptacle walls is calculated. The relative point of impingement serves, particularly in automatic control of the transfer device 3, as a relative base point for control. Thus the distance or the relative position of the transport vehicle from the theoretical point of impingement can advantageously be assumed as a nominal value in setting the nominal configuration. This then produces reactions of the automatic control which come close to manual control of the transfer device by the operator of the harvesting machine 1 and so produce confidence in automatic control.

By additionally taking into consideration at least one parameter affecting the transfer process, on alteration of the parameter, a compensating alteration of the adjustment of the transfer device 3 is effected automatically. As a result, an altered adjustment of the transfer device 3 is achieved in such a way that a desired transfer point is automatically approximately maintained. Furthermore, automatic control can have the object of keeping the theoretical point of impingement constantly on the driving track of the harvesting machine 1, on the driving track of the transport vehicle, or within the theoretical position of the transport receptacle.

In another embodiment, a warning signal is generated if the theoretical point of impingement of the crop on the transport receptacle lies outside the transport receptacle. Advantageously, a warning signal is generated when the transport vehicle is driven outside a possible range of adjustment of the transfer device 3 or the operator of the harvesting machine makes a manual adjustment of the transfer device which leads to a loss of crop. This affords the advantage, particularly in case of transfer in the dark or transfer in the vicinity of transport receptacle walls which cannot be seen, that a loss of crop can be indicated and avoided. Advantageously, this detection can be active even when the automatic control of the transfer device 3 is deactivated. A manual adjustment of the setting of the transfer device 3 that would lead to a theoretical point of impingement of the crop outside the transport receptacle is prevented. As a result, the operator of the transfer device, upon a corresponding actuation of the transfer device 3, cannot adjust the transfer device in such a way that crop would be transferred adjacent to the transport receptacle. This is particularly advantageous for avoiding operating errors and losses when the respective operator has already been sitting on the harvesting machine 1 for a long time and is tired or when, with the onset of dark, the contours of the vehicles can no longer be seen accurately. The respective absence of a reaction to an actuation or stopping of the corresponding reaction to an actuation then advantageously indicates to the operator the intended or imminent exceeding of an adjustment limit and transfer outside the transport receptacle. A warning and simultaneous or subsequent prevention of the reaction to the manual actuation can also be combined.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

We claim:

1. An apparatus for automatic adjustment of a transfer device on a self-propelled agricultural harvesting machine, which controls the transfer of harvested crop from the harvesting machine to a transport vehicle, including:
    at least one sensor for determining the current position of the transfer device;
    means for adjustment of the transfer device;
    at least one navigation device located in the harvesting machine for determining a first and at least a second navigated position of the harvesting machine in a field; and
    an electronic analyzer wherein the electronic analyzer automatically adjusts the transfer device via the means for adjustment and as a function of the current position of the transfer device and the first and second navigated positions of the harvesting machine.

2. An apparatus for automatic adjustment of a transfer device on a self-propelled agricultural harvesting machine according to claim 1, further including a second navigation device located on the transport vehicle for determining at least one navigated position of the transport vehicle and wherein the second navigation device communicates the navigated position of the transport vehicle to the electronic analyzer for use in automatically adjusting the transfer device.

3. An apparatus for automatic adjustment of a transfer device on a self-propelled agricultural harvesting machine according to claim 1, further including a distance sensor located on the harvesting machine and wherein the distance sensor determines the distance between the harvesting machine and the transport vehicle and communicates that distance to the electronic analyzer for use in automatically adjusting the transfer device.

4. An apparatus for automatic adjustment of a transfer device on a self-propelled agricultural harvesting machine according to claim 1, further including at least one sensing means for detecting at least one parameter of the harvesting process and wherein said sensing means communicates the parameter to the electronic analyzer for use in automatically adjusting the transfer device.

5. An apparatus for automatic adjustment of a transfer device on a self-propelled agricultural harvesting machine according to claim 1, further including a machine monitoring means for determining machine-specific variables and safety variables, wherein said machine monitoring means communicates the machine-specific variables and safety variables to the electronic analyzer for use in automatically adjusting the transfer device.

6. An apparatus for automatic adjustment of a transfer device on a self-propelled agricultural harvesting machine according to claim 1, further including at least one global-positioning system aerial mounted on the harvesting machine and on the vertical axis of rotation of the transfer device, which communicates with the electronic analyzer.

7. An apparatus for automatic adjustment of a transfer device on a self-propelled agricultural harvesting machine according to claim 6, further including at least one global-positioning system that is aerial mounted on a transport receptacle of the transport vehicle and communicates with the electronic analyzer.

8. An apparatus for automatic adjustment of a transfer device on a self-propelled agricultural harvesting machine, which controls the transfer of harvested crop from the harvesting machine to a transport vehicle, including:
    at least one sensor for determining the current position of the transfer device;
    a first navigation device for determining a first and at least a second navigated position of the harvesting machine;

an electronic analyzer for generating at least one adjusting parameter for the transfer device as a function of the current position of the transfer device and the first and second navigated positions of the harvesting machine; and means for automatically adjusting the transfer device based on the adjustment parameter generated by the electronic analyzer.

9. The apparatus for automatic adjustment of a transfer device self-propelled agricultural harvesting machine according to claim 8, further including means for determining the distance between the harvesting machine and the transport vehicle, wherein this distance is considered while generating the adjusting parameter for the transfer device.

10. The apparatus for automatic adjustment of a transfer device on a self-propelled agricultural harvesting machine according to claim 9, further including a second navigation device on the transport vehicle, wherein the means for determining the distance between the harvesting machine and the transport vehicle includes means for calculating the relative positions of the harvesting machine and the transport vehicle as measured by the first navigation device on the harvesting machine and the second navigation device on the transport vehicle.

11. The apparatus for automatic adjustment of a transfer device on a self-propelled agricultural harvesting machine according to claim 10, wherein the means for determining the distance between the harvesting machine and the transport vehicle includes a distance sensor on the harvesting machine to serve as a back-up to the first and second navigation devices.

12. The apparatus for automatic adjustment of a transfer device on a self-propelled agricultural harvesting machine according to claim 8, further including:

means for manually positioning the transport vehicle and the transfer device into a desired initial relative position;

a memory device communication with the electronic analyzer for storing the initial relative position; and means for using the initial relative position as a nominal configuration for subsequent automatic adjustment of the transfer device.

13. The apparatus for automatic adjustment of a transfer device on a self-propelled agricultural harvesting machine according to claim 8, further including:

means for determining the current position of the harvesting machine at successive time periods;

a memory device communicating with the electronic analyzer for storing each current position of the harvesting machine; and means for calculating a driving track for the harvesting machine based on the stored current positions, wherein the driving track is considered while generating the adjusting parameter for the transfer device.

14. The apparatus for automatic adjustment f a transfer device on a self-propelled agricultural harvesting machine according to claim 8, further including:

means for determining the current position of the transport vehicle at successive time periods;

means for storing each current position of the transport vehicle in the memory device; and means for calculating a driving track for the transport vehicle based on the stored current positions, wherein the driving track is considered while generating the adjusting parameter for the transfer device.

15. The apparatus for automatic adjustment of a transfer device on a self-propelled agricultural harvesting machine according to claim 14, further including means for calculating at least one relative position of a transport receptacle of the transport vehicle based on the current positions of the harvesting machine, the transport vehicle, the transport receptacle; the driving track of the transport vehicle; and the dimensions of the transport vehicle.

16. The apparatus for automatic adjustment a transfer device on a self-propelled agricultural harvesting machine according to claim 14, further including means for calculating a transfer distance from the distance between the driving tracks of the harvesting machine and the transport vehicle, wherein the transfer distance is considered while generating the adjusting parameter for the transfer device.

17. The apparatus for automatic adjustment of a transfer device on a self-propelled agricultural harvesting machine according to claim 8, further including means for calculating a transfer distance from a manual adjustment of a control element, wherein the transfer distance is considered while generating the adjusting parameter for the transfer device.

18. The apparatus for automatic adjustment a transfer device on a self-propelled agricultural harvesting machine according to claim 8, further including a distance sensor for calculating a transfer distance, wherein the transfer distance is considered while generating the adjusting parameter for the transfer device.

19. The apparatus for automatic adjustment of a transfer device on a self-propelled agricultural harvesting machine according to claim 8, further including means for calculating a theoretical point of impingement of crop into a transport receptacle of the transport vehicle based on the dimensions of the transport receptacle and the current position of the transfer device.

20. The apparatus for automatic of a transfer device on a self-propelled agricultural harvesting machine according to claim 19, wherein the means for calculating the theoretical point of impingement includes using at least one parameter affecting the transfer process.

21. The apparatus for automatic adjustment a transfer device on a self-propelled agricultural harvesting machine according to claim 19, wherein the means for calculating the theoretical point of impingement includes means for generating a warning signal if the calculated theoretical point of impingement lies outside of the transport receptacle.

22. The apparatus for automatic adjustment of a transfer device on a self-propelled agricultural harvesting machine according to claim 19, further including means for manually adjusting the transfer device to prevent a theoretical point of impingement outside of the transport receptacle.

23. The apparatus for automatic adjustment of a transfer device on a self-propelled agricultural harvesting machine according to claim 19, further including means for automatically adjusting the movement of the harvesting machine and transport vehicle relative to one another, rather than forcing the transfer device beyond the preset limit.

24. The apparatus for automatic adjustment a transfer device on a self-propelled agricultural harvesting machine according to claim 8, further including means for selecting the method for automatic adjustment of the transfer device as a function of the position of the transfer device relative to the longitudinal axis of the harvesting machine.

* * * * *